May 30, 1967     J. S. HUBBARD     3,322,396
TOWING VEHICLE
Filed Jan. 7, 1966     3 Sheets-Sheet 1
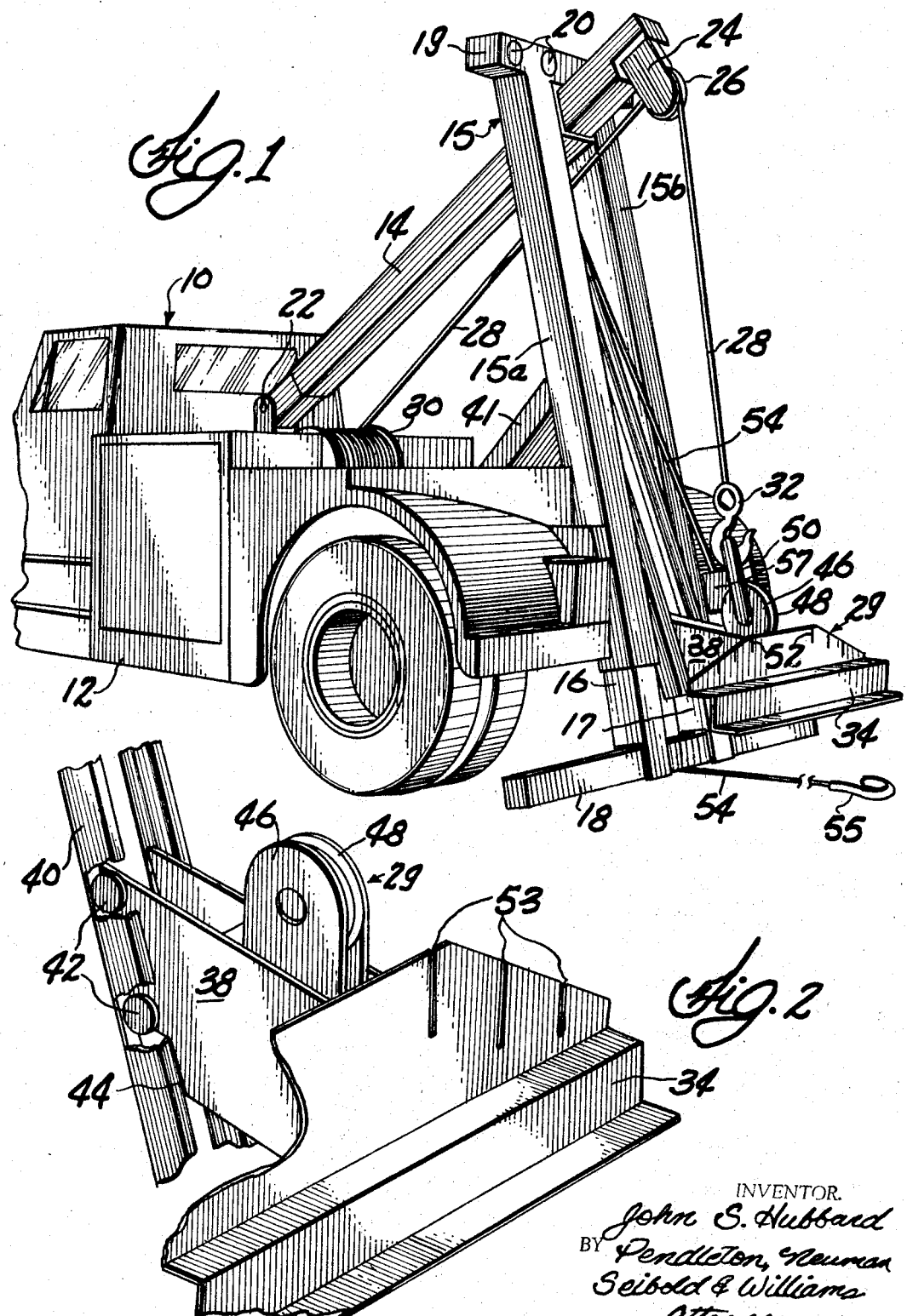

May 30, 1967  J. S. HUBBARD  3,322,396
TOWING VEHICLE
Filed Jan. 7, 1966  3 Sheets-Sheet 2
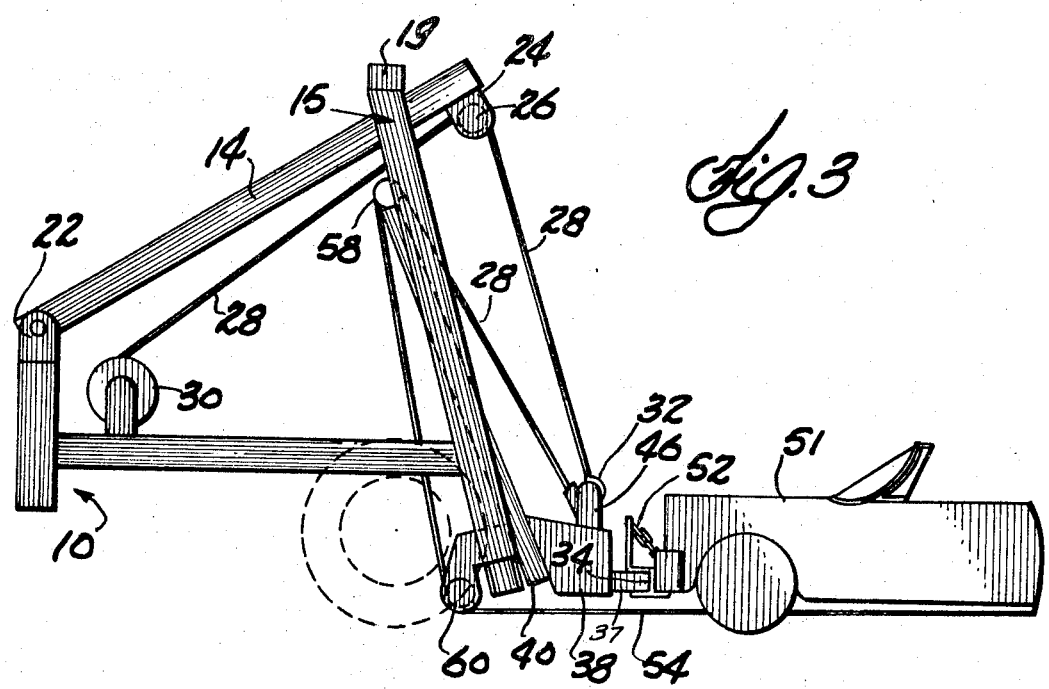
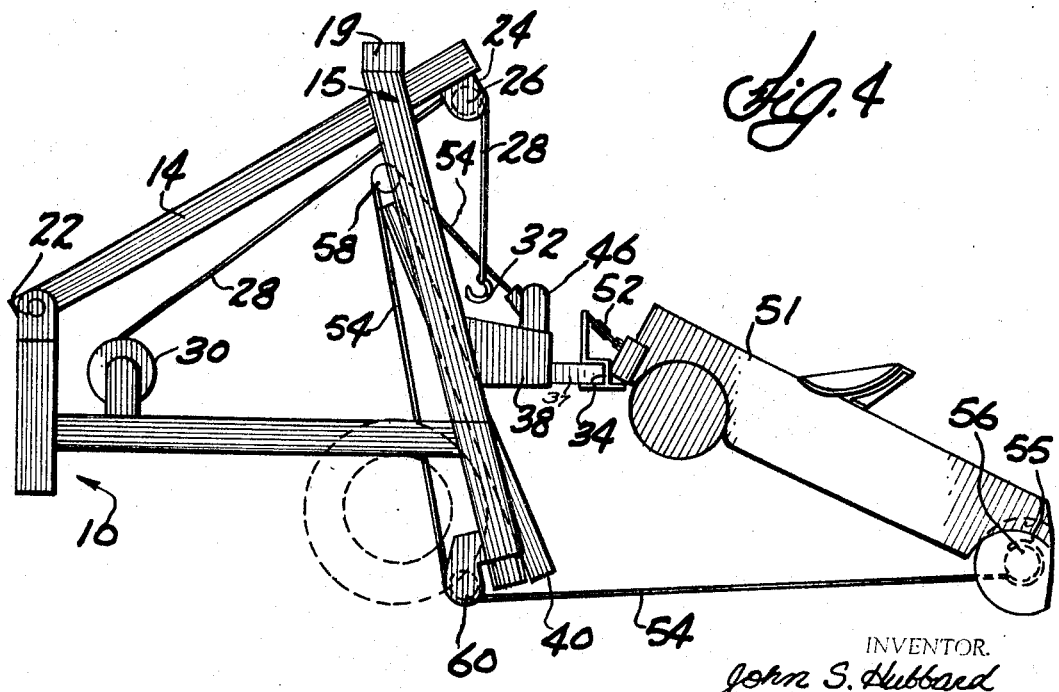
INVENTOR.
John S. Hubbard
BY Pendleton, Neuman,
Seibold & Williams
Attorneys

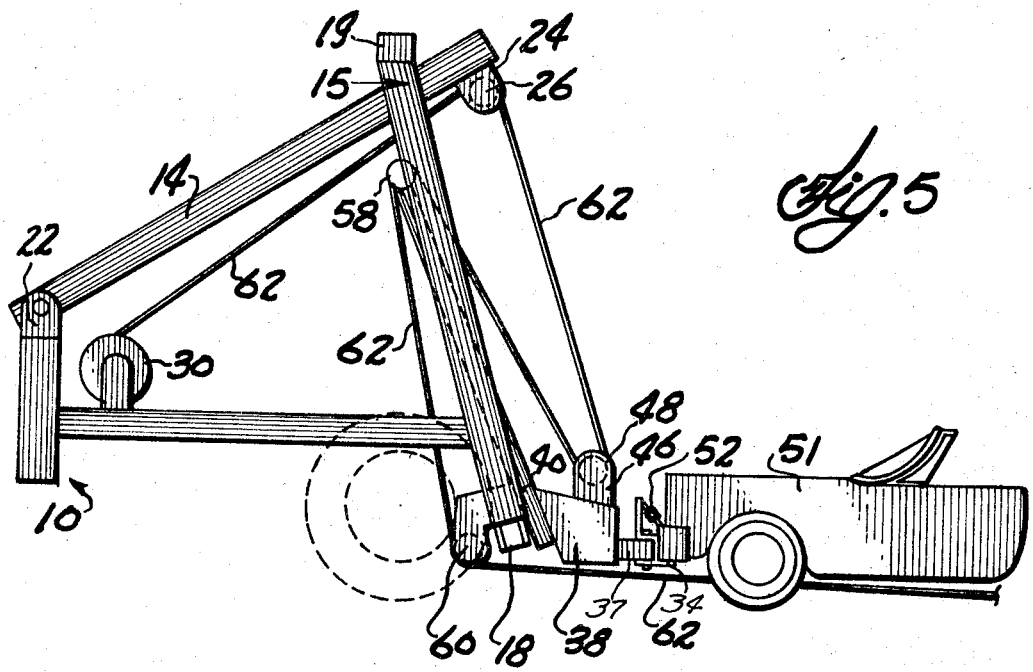
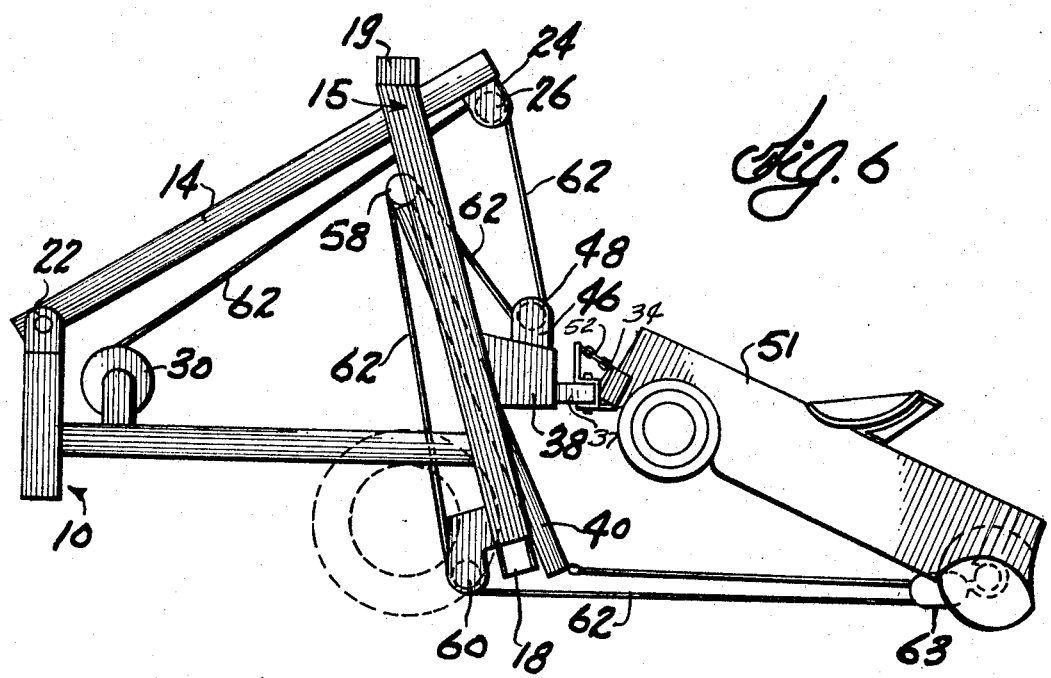

United States Patent Office 3,322,396
Patented May 30, 1967

3,322,396
TOWING VEHICLE
John S. Hubbard, Parker, Ind. 47368
Filed Jan. 7, 1966, Ser. No. 519,377
10 Claims. (Cl. 254—139.1)

This invention relates to a towing vehicle and more particularly to one which is adapted to handle disabled vehicles, such as trucks and automobiles.

In the tow trucks or wreckers heretofore used essentially all of the load was supported by the rear axle of the towing vehicle. By reason of such arrangement the size of load that the vehicle could carry was limited and furthermore, the manner of engaging the load frequently rendered the towing vehicle unstable, especially when rounding corners and when traveling over hills or other grades.

To overcome these disadvantages, it is one object of this invention to provide a towing vehicle in which there is greater distribution of the weight of the load between the front and rear axles of the towing vehicle, thereby effecting greater stability for the towing vehicle and at the same time substantially increasing its load-carrying capability.

It is another object of this invention to provide a towing apparatus which may be incorporated into existing wreckers or tow trucks, and thereby improve the stability and load-carrying capability of said wreckers or tow trucks.

It is a further object of this invention to provide towing apparatus which is of simple, yet economical construction and is most efficient in operation.

Further and additional objects will become manifest from the following description, the drawings, and the claims.

In one form, this invention consists of a towing vehicle having first means for elevating and supporting one end of a disabled vehicle and a second means cooperating with and extending from said first means for engaging and pulling the opposite unelevated end of said disabled vehicle. The first means comprises an upstanding support mounted on the base of the towing vehicle and a unit carried thereby movable upwardly and downwardly relative thereto; and a winch mounted on said base and including a cable extending therefrom and engaging said support unit to effect controlled movement thereof. The second means comprises a cable engaging said unit and upper and lower segments of said support and extending rearwardly therefrom a distance sufficient to permit the rear distal end of said cable to be connected to the unelevated end of the disabled vehicle. The second means cable exerts a pulling force on the rear end of the disabled vehicle and a lifting force on the front end of the disabled vehicle, and thereby distributes the total carrying load between the rear and front axles of the towing vehicle.

For a more complete understanding of this invention, drawings have been provided wherein:

FIGURE 1 is a fragmentary perspective view of one embodiment of this invention;

FIG. 2 is an enlarged fragmentary perspective view of the elevating mechanism incorporated in the vehicle of FIG. 1;

FIG. 3 is a diagrammatic side elevational view of the embodiment of FIG. 1 showing a disabled vehicle attached thereto but prior to same being elevated;

FIG. 4 is similar to FIG. 3 but showing the disabled vehicle in an attached and elevated position;

FIG. 5 is similar to FIG. 3 but showing a modified form of the invention;

FIG. 6 is similar to FIG. 5 but showing the disabled vehicle in an attached and elevated position.

Referring now to the drawings, and particularly to FIG. 1, a towing vehicle or truck 10 is shown, which in this instance includes a mobile base or bed 12, a boom 14 mounted thereon and extending upwardly and rearwardly therefrom, and a boom support 15 fixed to a rear portion of said base. The support 15 has mounted on the top thereof a transverse bar 19 which contains a plurality of warning lights 20. In the illustrated embodiment, the boom 14 has telescoping sections which permit rearward and upward extension thereof of approximately 5 feet. The boom is attached to approximately the center or forward portion of the base 12 by a bracket and rod assembly 22. The boom support 15 is generally inclined forwardly from the rear of the base at an angle varying from 0 degrees to about 30 degrees from the vertical. The support 15 includes a pair of spaced, parallel channel-like members 15a and 15b which are affixed to the rear end of the base. In telescoping or extensible relation with the lower ends of members 15a and 15b are legs 16 and 17, to the lower end of which is connected a rigid beam 18. The beam 18 is shown in FIG. 1 in its lowered position in contact with the ground. In this position, the beam prevents the towing vehicle from rolling or tipping when a load (disabled vehicle) is being pulled from a ditch or the like. The beam 18 is retracted while the load is being towed. Retraction and extension of legs 16 and 17 is accomplished by hydraulic means.

At the free end of the boom 14 is a housing or bracket 24 supporting a pulley 26. Passing over pulley 26 is a cable 28, extending from a winch 30, which is anchored to the center or forward part of the base 12. At the end of the cable 28, depending from pulley 26, is a conventional hook 32. The hook 32 is shown as attached to a means 29 for raising and supporting the front end of the disabled vehicle.

The supporting means 29 is enlarged and shown in greater detail in FIG. 2. It comprises a saddle 34 which is rotatable or self-aligning in a horizontal plane about a pivot 35. The saddle 34 is carried by a bar 37 (see FIGS. 3–6) which is connected in telescoping relation to a spacer bar 38. A track 40 permanently fixed to support 15, is provided for receiving the end of the spacer bar 38. Both track 40 and support 15 are buttressed by a brace 41 anchored to base 12 (see FIG. 1). The track 40 has channels which accommodate rollers 42 connected to the end of the spacer bar 38. These rollers permit bar 38 to move upwardly and downwardly relative to the track 40; and in all positions of movement, the cooperation of the track 40 and rollers 42 retains the spacer bar 38 in the same angular position relative to the base 12. The spacer bar is provided with an offset portion 44 which permits the bar, together with the attached saddle 34, to be brought closer to the ground.

If desired, the support means 29 and the track 40 may be eliminated and in place thereof an upright panel or supporting surface may be substituted against which the front end of the disabled vehicle engages and slides upwardly. In such an arrangement the hook 32 engages directly the front end of the vehicle.

Extending upwardly from, and permanently fixed to, the spacer bar 38 is a housing 46 which contains a pulley 48. In FIGS. 1-4, this pulley 48 is not shown in use, but its application in this invention will be hereinafter described. An H-shaped member 50 extends from the pulley housing 46, and receives the hook 32 which is attached to the winch cable 28. Thus, operation of the winch effects the vertical movement of the spacer bar 38 and the consequent vertical movement of the saddle 34.

FIGS. 3 and 4 diagrammatically illustrate the embodiment of FIG. 1. FIG. 3 shows a disabled vehicle 51 (load) with the front end thereof mounted on the saddle 34, prior to the latter being raised. To prevent the vehicle from slipping off the saddle 34, a safety chain 52 or other suitable means is connected to the vehicle bumper and engages one of the slots 53 formed in a vertical segment of the saddle 34 (see FIGS. 1 and 2). The vehicle 51 is raised to the desired height, by the operation of winch 30 and cable 28, as shown in FIG. 4; and then a cable 54 of fixed length, called an anchor cable, is attached by means of a hook 55 to the rear axle 56 or other suitable low part of the frame of vehicle 51. As may readily be seen from FIGS. 1, 3 and 4, this cable 54 is connected at its other end to a member 57 which in turn is mounted on the pulley housing 46. The cable 54 extends over pulleys 58 and 60 located at the top and bottom, respectively, of track 40. Pulleys 26, 48, 58 and 60 are preferably aligned in a vertical plane, which is the longitudinal median plane of the towing vehicle. Once the vehicle 51 is in the desired elevated position, the winch cable 28 may be slackened and the hook 32 removed from member 50, as shown in FIG. 4, whereupon the load is carried entirely by the anchor cable 54.

When in the position illustrated in FIG. 4, the load 51 causes the tension in the cable 54 to remain constant throughout the towing operation. As the load is pulled over grades or around corners, the length of the cable between the rear axle 55 of the load 51 and the pulley 60 may vary, but this change will be automatically compensated for by movement of the spacer bar 38 and the attached saddle 34 supporting the front end of the load 51. With the embodiment of FIGS. 3 and 4, wherein the anchor cable 54 is of a fixed length, it may be desirable to provide some means for varying the distance between pulleys 58 and 60 so as to compensate for those disabled vehicles having unusually large or small wheel bases. One way of accomplishing such a result would be to have pulley 58 supported on a section which is extensible relative to the upper end of track 40. Another way of achieving this result would be to have a sectional cable in which sections can be added or removed.

In the modified embodiment shown in FIGS. 5 and 6, a single continuous cable 62 is employed instead of the winch cable 28 and the anchor cable 54. In this embodiment, pulley 48 is utilized together with pulleys 26, 58 and 60. Since the cable 62 is continuous and is wound on the winch 30, the cable is, of course, not detached when the load is elevated to its towing position and the winch 30 is not released. One advantage that the embodiment of FIGS. 1, 3 and 4 has over the embodiment of FIGS. 5 and 6 is that, if the tow truck is not used solely for towing, the winch cable can always be readily unhooked and available for other lifting operations. With the embodiment of FIGS. 5 and 6, however, no means is required for varying the distance between pulleys 58 and 60 to compensate for the disabled vehicles having extraordinary sized wheel bases.

To illustrate the load carrying characteristics of a 1964 GMC 6500 tow truck having the conventional boom type crane, on the one hand, and the improved mechanism shown in FIGS. 3 and 4, on the other hand, the following results were determined:

In each case with no load, the weight on the front axle of the truck was 5300 lbs. and the weight on the rear axle was 8940 lbs. The load to be lifted in each case was 18000 lbs. and the height to which the load was lifted above ground was the same, approximately 5 feet.

|  | Front axle load | Rear axle load |
| --- | --- | --- |
| Conventional construction | −700 lbs. | +32,940 lbs. |
| The construction embodying this invention. | +6,250 lbs. | +22,500 lbs. |

The foregoing results clearly indicate that with the above described mechanisms of this invention, there is a marked improvement in load distribution between the front and rear axles of the tow truck. Thus, the load carrying capacity of a tow truck incorporating the present invention is substantially increased.

By way of modifying the above described improved construction, a snatch block and hook assembly 63 may be substituted for the hook 55 (see FIG. 4) which engages the rear axle of the disabled vehicle 51. With such an arrangement the lower end of the cable subsequent to passing around the snatch block and hook assembly is affixed to the back end of the towing truck 10 near pulley 60. By utilizing the snatch block and hook assembly an even greater proportion of the load weight can be shifted to the front axle of the towing truck than above noted.

While several embodiments of this invention have been described above, further modifications may be made thereto and it is contemplated, therefore, by the appended claims, to cover any such modifications as fall within the true spirit nad scope of this invention.

I claim:

1. A vehicle for towing a load comprising: a base adapted to move along a surface; a support mounted on said base and extending upwardly therefrom; means for engaging and elevating a portion of the load disposed adjacent said support, said means being adapted for vertical movement with respect to said support; means for raising and lowering said elevating means; a cable carried by said support, one end of said cable being engageable with said elevating means and other end being engageable with a portion of the load remote from said support; a pair of vertically spaced cable bearing members carried by said support, the distance between said cable bearing members and the length of said cable being such that the cable will be maintained under tension when in engagement with said elevating means and with said load and the portion of said load in engagement with said elevating means will be maintained in an elevated position.

2. The towing vehicle recited in claim 1 wherein said support includes a boom mounted on said base and extending upwardly and rearwardly therefrom and an elongated boom support means mounted on the rear of said vehicle extending upwardly therefrom, said elevating means are carried by said boom support means and movable longitudinally thereof, and the means for raising and lowering the elevating means are power actuated.

3. The towing vehicle recited in claim 2 wherein said vertically spaced cable bearing members are mounted on said boom support means and said elevating means are in rolling contact with said boom support means.

4. The towing vehicle recited in claim 2 wherein the portion of said boom support contacted by said elevating means is inclined forwardly from the vertical less than 30 degrees.

5. The towing vehicle recited in claim 2 wherein said power actuated means includes a winch mounted on said base and a cable extending therefrom over the rear end of said boom, the terminating end of said cable releasably engaging said elevating means.

6. The towing vehicle recited in claim 2 wherein said power actuated means includes a winch mounted on said base and the end of the cable which engages the elevating means extends therefrom over the rear end of the boom and terminates at said winch.

7. The towing vehicle recited in claim 6 wherein said elevating means includes an idling pulley over which said cable passes.

8. The towing vehicle recited in claim 1 wherein the end of said cable engaging the remote portion of the load engages said load by means of a snatch block and hook assembly.

9. The towing vehicle recited in claim 2 wherein said cable bearing members comprise a plurality of idling pulleys.

10. The towing vehicle recited in claim 9 wherein said pulleys are aligned in the vertical longitudinal median plane of the vehicle.

References Cited

UNITED STATES PATENTS

| 2,818,984 | 1/1958 | Nims | 214—86 |
| 2,933,211 | 4/1960 | Smith | 214—86 |

EVON C. BLUNK, *Primary Examiner.*

SAMUEL F. COLEMAN, *Examiner.*

H. C. HORNSBY, *Assistant Examiner.*